United States Patent
Moskowitz et al.

(10) Patent No.: US 7,375,631 B2
(45) Date of Patent: May 20, 2008

(54) ENABLING AND DISABLING A WIRELESS RFID PORTABLE TRANSPONDER

(75) Inventors: Paul A. Moskowitz, Yorktown Heights, NY (US); Robert J. von Gutfeld, New York, NY (US)

(73) Assignee: Lenovo (Singapore) Pte. Ltd., Singapore (SG)

(*) Notice: Subject to any disclaimer, the term of this patent is extended or adjusted under 35 U.S.C. 154(b) by 443 days.

(21) Appl. No.: 10/899,489

(22) Filed: Jul. 26, 2004

(65) Prior Publication Data

US 2006/0017570 A1   Jan. 26, 2006

(51) Int. Cl.
*G08B 13/14* (2006.01)
(52) U.S. Cl. .................. 340/572.1; 150/147; 257/679; 361/818
(58) Field of Classification Search ............. 340/572.1
See application file for complete search history.

(56) References Cited

U.S. PATENT DOCUMENTS

| | | | |
|---|---|---|---|
| 4,728,938 A | 3/1988 | Kaltner | 340/572 |
| 4,835,524 A | 5/1989 | Lamond et al. | 340/572 |
| 5,538,803 A | 7/1996 | Gambino et al. | 428/694 TM |
| 5,563,583 A | 10/1996 | Brady et al. | 340/572 |
| 5,581,257 A | 12/1996 | Greene et al. | 342/51 |
| 6,025,780 A | 2/2000 | Bowers et al. | 340/572 |
| 6,121,544 A * | 9/2000 | Petsinger | 174/353 |
| 6,181,248 B1 | 1/2001 | Fockens | 340/572 |
| 6,317,028 B1 | 11/2001 | Valiulis | 340/10.1 |
| 6,970,070 B2 * | 11/2005 | Juels et al. | 340/10.1 |
| 2002/0175873 A1 * | 11/2002 | King et al. | 343/767 |
| 2005/0179552 A1 * | 8/2005 | Shoji et al. | 340/572.7 |
| 2006/0017571 A1 * | 1/2006 | Arnold et al. | 340/572.7 |

FOREIGN PATENT DOCUMENTS

EP   1 010 152   4/2004

OTHER PUBLICATIONS

U.S. Appl. No. 2002/0117543 published on Aug. 29, 2002.
U.S. Appl. No. 2002/0149468.
International Application No. WO 02/084584 published on Oct. 24, 2002.
"RFID Backlash Prompts 'Kill' Feature," by Junko Yoshida, Apr. 28, 2003, Internet URL: http://www.eetimes.com/article/showArticle.jhtml?articleid=12803964.
"STMicroelectronics Launches UHF RFID Chip Fully Supporting EPCglobal Class 1 Specification," Internet URL: http://www.st.com/stonline/press/news/year2004/p1462m.htm.

(Continued)

*Primary Examiner*—Daniel Wu
*Assistant Examiner*—George A. Bugg
(74) *Attorney, Agent, or Firm*—John L. Rogitz (57) ABSTRACT

Provides protection to wireless portable transponders from an unauthorized interrogation by employing a mechanical member. Transponders include: cards, fobs and RFID tags that a persons may carry. Such transponders generally have means for receiving and storing electronic and other information, commonly in binary form using memories as in electronic circuits, etc. The invention is designed to provide privacy of electronic information and yet permit the information to be queried at the users discretion. The cards and tags can be protected from receiving or providing unauthorized or unwanted information. The invention provides the mechanical member with means that permit the owner to decide when reception/interrogation of personal or other information is desirable by employing the provided mechanical enable/disable control means.

22 Claims, 6 Drawing Sheets

OTHER PUBLICATIONS

"ELocity Inc., Friday's Stock Focus Alerts You on RFID Technology," Florida, Apr. 16, 2004, Internet URL: boston.com.

"EnXnet's Emerging Technology Solves Privacy Concerns," Oklahoma, Apr. 15, 2004, Internet URL: boston.com.

"EnXnet's RFID Deactivation Device Vital Role in the Consumer Marketplace," Oklahoma, Apr. 20, 2004, Internet URL: boston.com.

"Overcoming the Consumer Privacy Concerns of Product Tracking Through RFID Tags," SANS Institute 2004, Steve Hankel, GIAC Security Essentials Certification (GSEC).

Juels, A. et al. "The Blocker Tag: Selective Blocking of RFID Tags for Consumer Privacy.".

"Active Breakthrough Performance through RFID Radio Frequency Identification Technology," Internet URL: http://www.rfida.com/rfidtech.htm.

"NCR Prototype Kiosk Kills RFID Tags," RFID Journal, Internet URL: http://www.rfidjournal.com/article/articleprint/585/-1/1/.

E-ZPass Plus, 2 pages—http://www.panynj.gov/ezpass.html.

Magnetic Field Shielding, pp. 1-7—http:/www.lessmf.com/mag-shld.html (as of Jul. 20, 2004).

ExxonMobil, 1 page—http:/www.exxonmobil.com/Siteflow/Brands/SF_BR_Speedpass.asp (as of Jul. 20, 2004).

Imperial Oil, 1 page—http:/www.speedpass.ca/Cabada-English/Products/Speedpass/PS_S_SpeedpassHomePage (as of Jul. 20, 2004).

American Expess Expands Availability of New "Contactless" Payment Product Designed To Make Everyday Purchases Quick And Easy, pp. 1-3, http:/home3.americanexpress.com/corp/latestnews/expresspay.asp (as of Jul. 20, 2004).

* cited by examiner

ENABLING AND DISABLING A WIRELESS RFID PORTABLE TRANSPONDER

FIELD OF THE INVENTION

The present invention is related to providing wireless portable transponders, such as cards and RFID tags, with user controlled mechanical protection from an unauthorized interrogation. More particularly, the invention provides mechanical means that permit a user to decide when transponder reception/interrogation of personal or other information is desirable.

BACKGROUND OF THE INVENTION

Portable transponders, employ RFID, Radio Frequency Identification, as the technology used to collect highway tolls, to serve as personal identification for access control, and to provide means for electronic information interchange, such as credit, etc. Passive RFID tags and wireless cards contain chips, (also known as computer chips, microchips, memory chips) which store identification and other information, such as credit card numbers, financial data, etc. Tags may be applied to items to identify the item in much the same way that bar codes are used. Information is retrieved from a tag as well as the wireless cards of the present invention by an RFID base station or reader when the tag or card is scanned with radio waves by the reader. The tags may draw their power to function from the interrogation field supplied by the base (read/write) station.

Such tags, passive tags, are described in U.S. Pat. No. 3,713,148, card Apparatus and System, issued to Cardullo and Parks. In its simplest form the RFID tag or device includes a circuit typically a silicon chip, although more than one chip may be used in the construction of the RFID device. The circuit is generally connected to an antenna. The RFID device or card may take on a variety of forms including that of a tag, a key fob, or a card. A battery may also be employed to extend the range of the device. It is also possible in principle to build devices that function as tags or wireless cards using electrical circuits including only resistors, capacitors and inductors as is well known by those skilled in the art. In some cases the circuit acts as an antenna and thus a separate antenna is not used.

There are also non-electrical circuit memory devices, which are responsive to interrogation, that may be used to construct identification devices contained within cards and tags. Examples of such memory devices include magnetic devices, or wires such as those described in U.S. Pat. No. 5,538,803, "Multibit Tag Using Barkhausen Effect," resonant structures such as are describe in U.S. Pat. No. 5,563,583, "Multibit Magnetic Radiofrequency Tag Using Micromechanics," and U.S. Pat. No. 5,581,257, "Radio Frequency Automatic Identification System".

Large scale retailers and their suppliers are pursuing Radio Frequency Identification, RFID, tagging for supply chain tracking of goods. Demonstrations of RFID for item tagging will lead to point of sale check out and data collection. At the same time, merchants are issuing credit/debit cards that allow a holder to be identified upon entering a place selling merchandise or at the point of sale. This card may be in the form of a credit card that has in it an RFID chip positioned between laminates of the card as well as an antenna attached to the chip, also generally placed within the card laminates. Since the card communicates by a wireless means, it may take other physical forms. For example, Speedpass (see www.speedpass.com) is a wireless RFID credit device that has the form of a small cylinder. It is a key fob carried on a key chain. Likewise, American Express has introduced an RFID credit card, ExpessPay, which is in the form of a rectangular key fob.

SUMMARY OF THE INVENTION

An aspect of the present invention, is to provide transponder information exchange privacy and control by mechanically activating and deactivating at least the RFID portion of the transponder, or card.

Another aspect of the present invention, is to enable a holder of a card to protect his/her privacy by shielding, effectively deactivating, the RFID portion of the card at will, while also making it possible to reactivate the card or tag at the holder's discretion. In addition, activation and deactivation of the RFID portion of the transponder, tag or card makes it possible for the user of the tag or card to select whether or not additional information should be entered onto the card or tag from known or unknown sources.

A further aspect of the present invention is to provide means for activating/deactivating a tag in a manner that causes little or no disruption to the intrinsic transponder, card or tag operating system.

In an example embodiment, a moveable piece of material is secured to the transponder, tag, fob or card that can be manually moved or slid in positions to (1) allow the antenna of the wireless device to be exposed to or (2) protect the antenna from radiation that may be used to interrogate the card.

The invention can also be implemented as a shielding method by providing a card having a circuit to be controlled, and mechanically coupling a shielding member to the card to selectively shield the circuit.

The invention is further implemented as a shielding method which selectively moves a shielding material mechanically coupled to a card such as to block an antenna, or other receiving device, in the card from receiving an external signal.

BRIEF DESCRIPTION OF THE DRAWINGS

The above and other objects, features, and advantages of the present invention will become more apparent from the following detailed description when taken in conjunction with the accompanying drawings, in which.

DETAILED DESCRIPTION OF THE INVENTION

The present invention provides methods, systems and apparatus to protect wireless transponders, such as cards, fobs or RFID tags that may be carried on a person, from an unauthorized interrogation. Such cards or tags have means for receiving and storing electronic information, commonly in binary form using memories and/or electronic circuits, typically, but not exclusively such as chips containing 'bits' to store the information. The invention is designed to provide privacy of this type of electronic information and yet permit the information to be queried at the users discretion. At the same time the cards and tags can be protected from receiving unauthorized or unwanted information. The invention provides means that permit a user, generally the owner, to decide when reception/interrogation of this personal information is desirable by simple mechanical means.

Since the issue of privacy is of utmost concern, it is most desirable under some circumstances to deactivate or disable at least the RFID portion of the card. It is the purpose of the present invention to make it possible for the holder of the card to protect his/her privacy by shielding, effectively deactivating, the RFID portion of the card at will, while also making it possible to reactivate the card or tag at the holder's discretion. The desire to activate or deactivate is likely to be a matter of choice decided by the holder of the card as to whether the holder wishes to be identified by the particular merchant upon entering the merchant's enterprise or environs. In addition, activation and deactivation of the RFID portion of the tag or card makes it possible for the holder of the tag or card to select whether or not additional information should be entered onto the card or tag from known or unknown sources.

In the present invention, advantageous means for activating/deactivating a tag is one that causes little or no disruption to the intrinsic card or tag operating system. Rather, to obtain the objective of enabling/disabling the card or tag at the card owner's choice, we impose a moveable piece of material, otherwise secured to the card that can be manually moved or slid in positions to (1) allow the antenna of the wireless device to be exposed to or (2) protect the antenna from radiation that may be used to interrogate the card. This shielding device can for example block (or cover) the card antenna preventing it from receiving an interrogation signal. The shield may be deployed, for example, when the RFID card is not in use to prevent the unauthorized detection or reading of the RFID device. On the other hand, the owner of the card may want to be recognized when entering an establishment in which case the slideable shielding device is positioned so as to uncover the antenna to allow the antenna to function normally.

As used herein the term card includes any type of portable transponder. The wireless portable transponder, a card and/ or tag, may have a dual purpose, that is it may act as a magnetic swipe card while also having the RFID identification. In the present invention it is possible to block the antenna to prevent unauthorized interrogation of the card while still leaving the magnetic portion of the card in a position to be used for actions such as debiting/crediting. While the magnetic portion will give certain information that may also be stored in the wireless memory portion of the card, blocking the antenna will still prevent unauthorized persons who might be in the establishment occupied by the cardholder from obtaining unauthorized information or adding unauthorized information.

Figure 1:
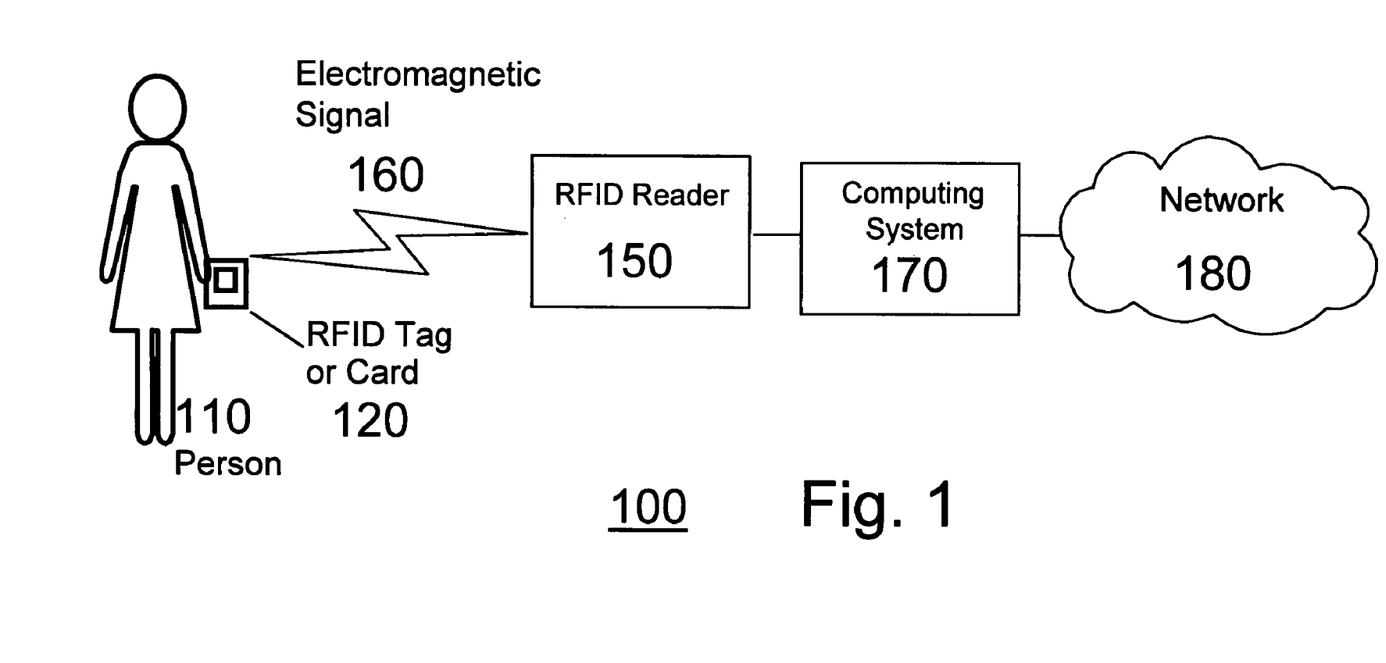
FIG. 1 illustrates an example of a system of the invention.

FIG. 1, illustrates a system of the invention 100. A person or cardholder 110 carries at least one wireless card or identification card 120. the card being interrogated by an RFID reader, the reading transmitted to a computing network. The card may be read through the use of an electromagnetic, EM, signal 160 that provides means for communication between the card 120 and a reader 150. Information received by the reader 150 may be transferred to a computing system 170 where it is processed and stored in a database. The system 170 may in turn be connected to a network 180 which makes possible the exchange of information with other computing systems.

In order to protect the privacy of the person 110, the card 120 is constructed with a built in deployable or slideable shield to screen magnetic or electric components or both of EM waves. The novel feature of the present invention is the deployable or slideable shield, described in detail in FIGS. 3, 4, 5, 6, 7, and 8, which can be used to prevent the antenna or the pickup coil from being exposed to a field for the purpose of interrogation of the card or placing additional information on the card.

It is well known by those skilled in the art that magnetic shielding can be accomplished through the use of mu metal, Metglas$^R$ or any high permeable magnetic material that has a reasonable coercivity, that is greater than several Oersteds. Mu metal is the generic name for materials that have a very high magnetic permeability. Both mu metal and Metglas$^R$ are alloy compositions which are basically permalloy or nickel-iron with varying amounts of cobalt, boron and other trace materials. In addition, these materials are designed to have exceedingly high permeabilities, on the order of 10 thousand to 1 million. Therefore, a circuit surrounded by such material can readily be protected from magnetic radiation depending on the thickness of the alloy, the alloy's coercive force, i.e. magnetic field, required to bring the material to a value of zero magnetization in a hysteresis loop) and the strength of the incoming radiation. There now exist special Metglas$^R$ formulations that have a high coercive force so that both these materials as well as mu metal can be used in thicknesses of greater than 0.001 cm to shield magnetic fields, reducing the incident field by 1 to 5 orders of magnitude depending on the thickness of the material. Where thicker material is used, the lower is the frequency of the electromagnetic wave incident on the card that may be shielded.

In general, the attenuation of an electromagnetic wave incident on a metal is given in terms of the skin depth of the material, $\delta$ (cm)

$$\delta = [2/(\omega \sigma \mu)]^{0.5} \tag{1}$$

where $\omega$, $\sigma$, $\mu$ are respectively, the angular frequency of the incident wave, electrical conductivity, and permeability of the shielding material. $\delta$ represents the depth, skin depth, within the shield at which the incident field has fallen to 37 percent of its incident value. Thus, for a depth equal to three skin depths into a shielding material, the incident field is reduced by 95 percent leaving 5 percent of the original field.

Electric Field Shielding: To obtain an understanding of the thickness of shielding material required for the present invention one can scale skin depth values from copper as taken from J. A. Stratton, 'Electromagnetic Theory'

McGraw Hill, pg 504 (1941). For an angular frequency of ~ 6000 radians/s, about 1 kHz, δ=0.21 cm.

Although the invention is suitable for any frequency wherein transponders operate, our most particular interest ranges presently in frequencies from ~100 kHz to 5.8 GHz. Wireless cards that are coupled through the electric component of the EM field operate at frequencies above 100 MHz, typically at 434 MHz, 915 MHz (869 MHz in Europe), or at microwave frequencies of 2.45 GHz and above. However, as a worst case example, we can consider the case of a card coupling to the electric field at 100 kHz. The skin depth for copper at 100 kHz is 0.02 cm using equation (1) and the reference cited above. Thus, an easily realizable 0.06 cm thickness of copper will shield an electric field coupled card operating at 100 kHz. At 14.56 MHz, 0.006 cm of copper is all that is required. This thickness will also be effective at all of the higher frequencies, 434 MHz and above, where electric field coupling is generally used. Typically we would use a copper thickness of 0.02 to 0.05 cm, at least an order of magnitude more than is needed, to attenuate any interrogation signal at 14.56 MHz and above.

Electric and Magnetic Field Shielding: Generally RFID cards that use magnetic coupling operate at frequencies of about 100 kHz to 14.5 MHz. To provide shielding, we employ mu metal or a Metglas with relatively high coercive force (greater than 10 Oersteds). Using a value for the permeability of $10^5$ and a conductivity that is $\frac{1}{50}$ that of copper, we obtain a value for δ of no more than about $10^{-4}$ cm. Thus, a mu metal thickness of about $10^{-3}$ cm or greater would work as a shield for any frequency at or above 100 kHz.

Figure 2:
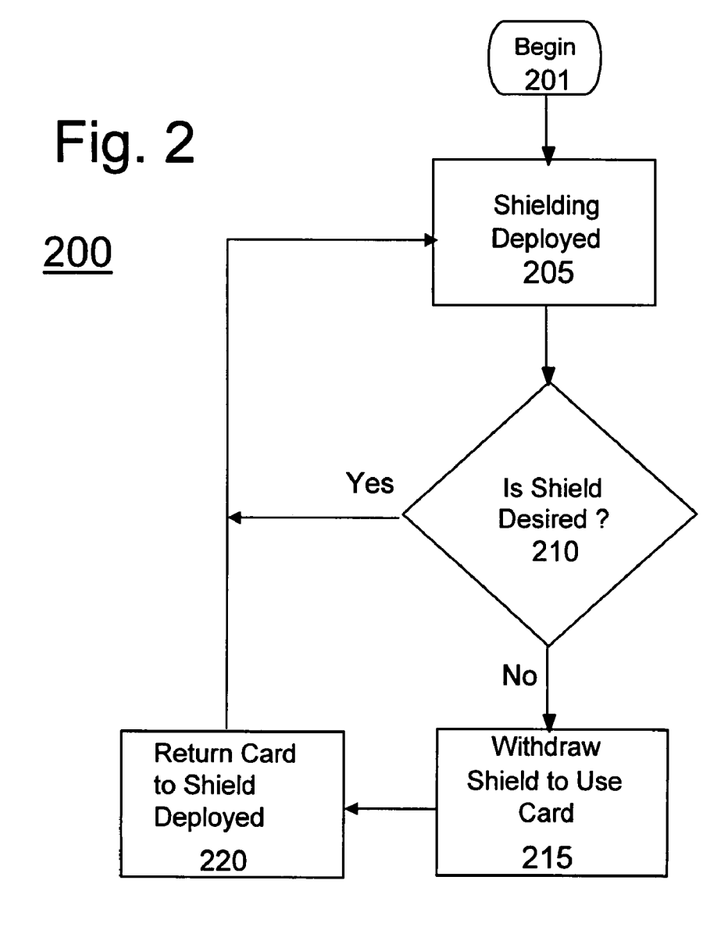
FIG. 2 shows a flow diagram illustrating a enable/disable function.

FIG. 2 shows a flow diagram 200 illustrating the enable/disable function. In the normal state of use for a card, the shielding is in a deployed position 205 to protect the privacy of the user. If the shielding is desired 210, no more is done. If the shielding is not desired 210, e.g. the user wishes that the card may be read, the shielding is withdrawn 215 and the card may be used. After the card is used, the shielding may be deployed again 220 to shield the card. In general, friction between the slideable element and the card holds the element in place.

Figure 3:
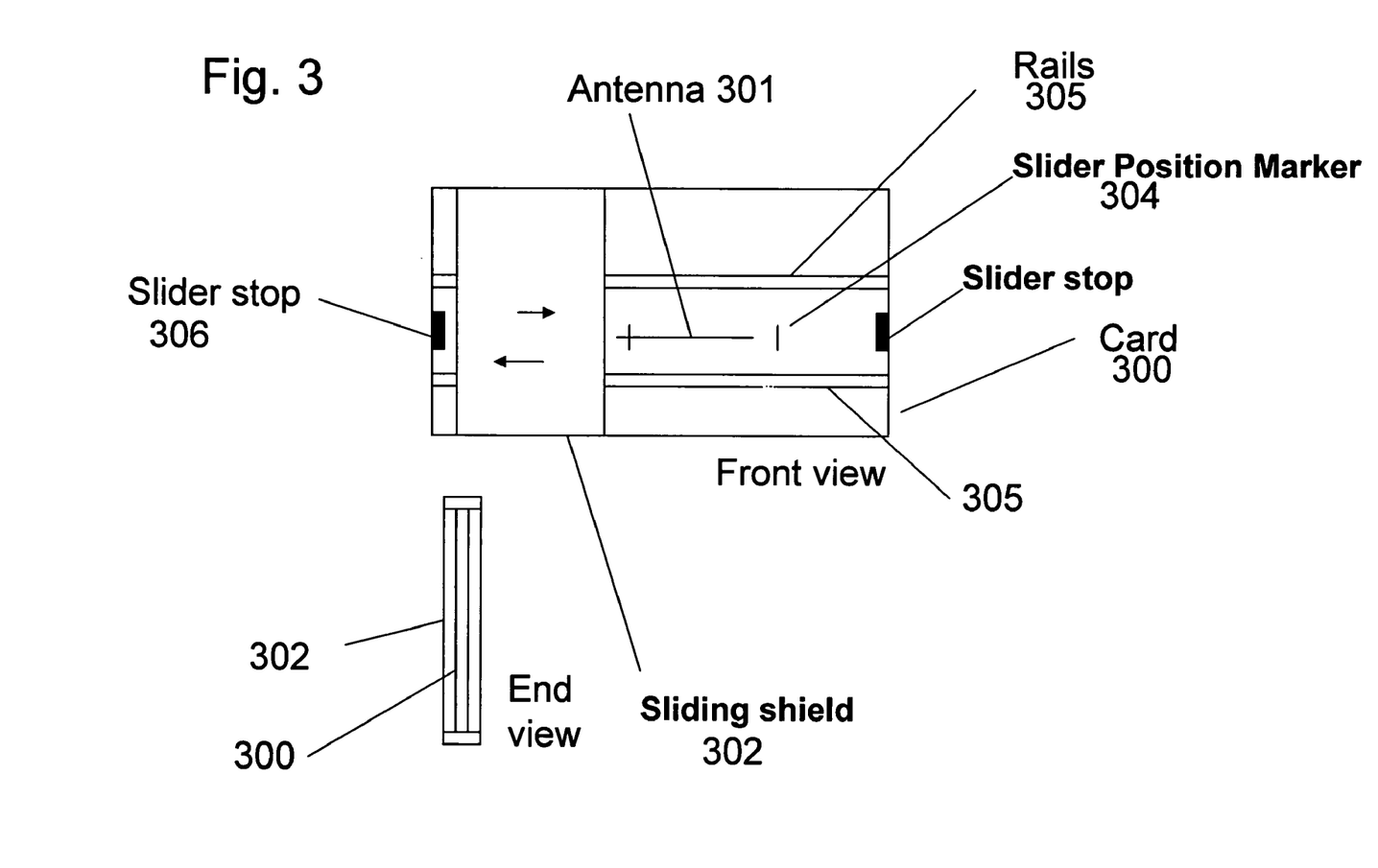
FIG. 3 is an example of a wireless card, in the form of a rectangular flat card, with a slideable device deployed in a manner making it possible to disable/enable the wireless card by covering or uncovering the antenna within or on the face of the card.

FIG. 3 is an example of a card with the slideable device deployed in a manner making it possible to disable/enable the wireless card by covering or uncovering the antenna within or on the face of the card. The card 300 is disabled by shielding the antenna 301 that is embedded (or may be on the surface of) in the card from receiving electromagnetic waves. The card contains a slideable, thin metallic section 302 that may be deployed or withdrawn. The metallic section may consist of a material that has a high magnetic permeability or a high electrical conductivity or both. Most high-permeability magnetic materials will also have sufficient electrical conductivity to shield both the magnetic and electric components of electromagnetic waves. Examples of such materials include mu metal and Alloy-42, a nickel-iron alloy (permalloy). Low frequency, LF, and high frequency (low MHz range), HF, RFID devices are generally read by means of magnetic coupling, while ultrahigh frequency, UHF, and microwave RFID tags are read by means of electric field coupling. Copper or aluminum may be used to shield UHF and microwave RFID devices.

In the diagram, the slideable member is slid over the section containing the antenna thereby making the antenna unable to receive an RF signal. This prevents identification. The slideable mechanism may be attached by small indentations in the card acting as rails 305. Slider stops 306 may be built into the card to keep the sliding shield on the card or moving more than necessary. Additionally, slider position markings 304 may be placed on the card to aid in the deployment of the shield.

Figure 4:
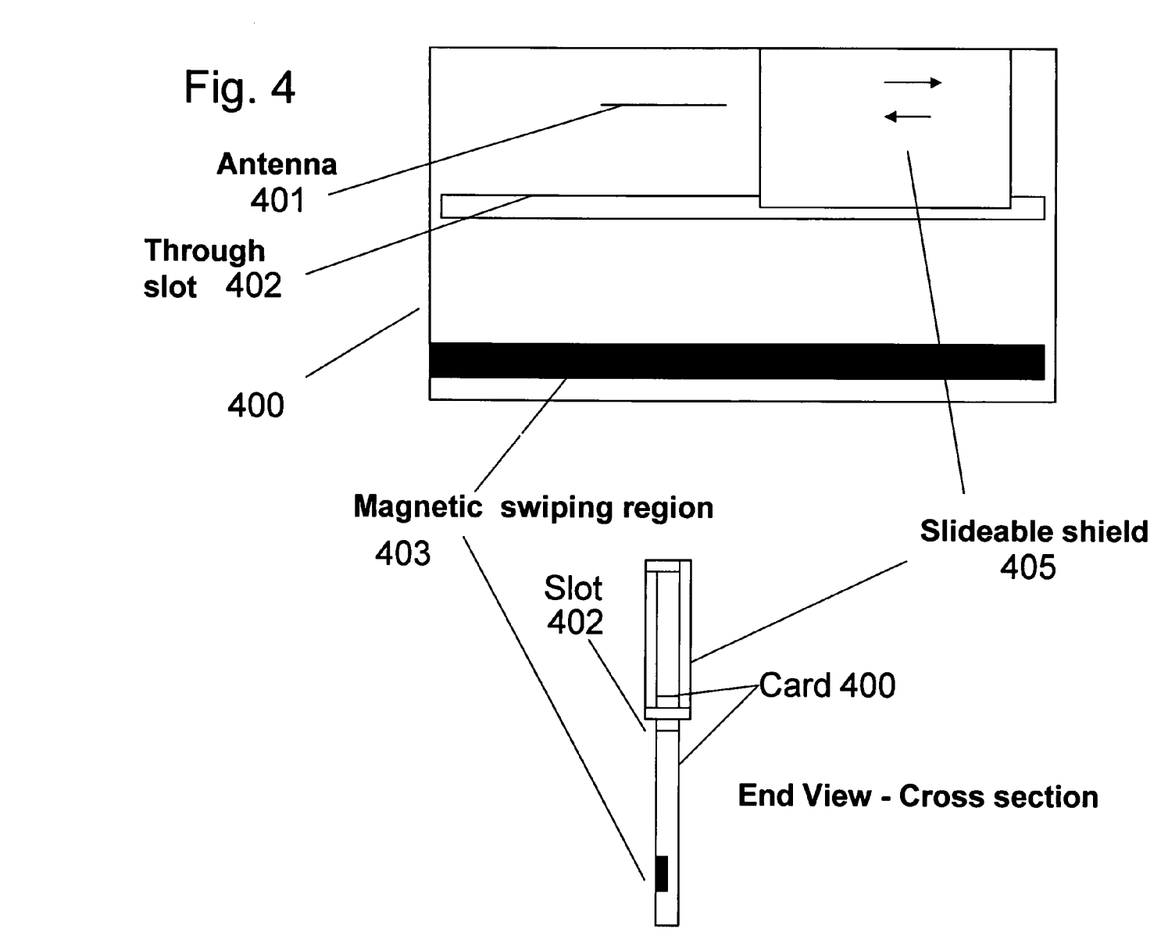
FIG. 4 shows a card containing both an antenna connected to a memory chip (not shown) and a magnetic stripe for swiping in a magnetic reader, in which the antenna can be enabled/disabled without affecting the magnetic stripe.

FIG. 4 shows a card 400 containing both an antenna 401 connected to a chip (not shown) and a magnetic stripe 403 for swiping in a reader. The antenna can be enabled/disabled without affecting the magnetic stripe. Since the card is also used as a conventional credit card with a magnetic stripe on one side, the magnetic shielding material 405 envelopes the portion of the card that contains the antenna. The slidable portion is positioned and retained on the card by the use of a through slot 402 as shown in the figure.

Figure 5:
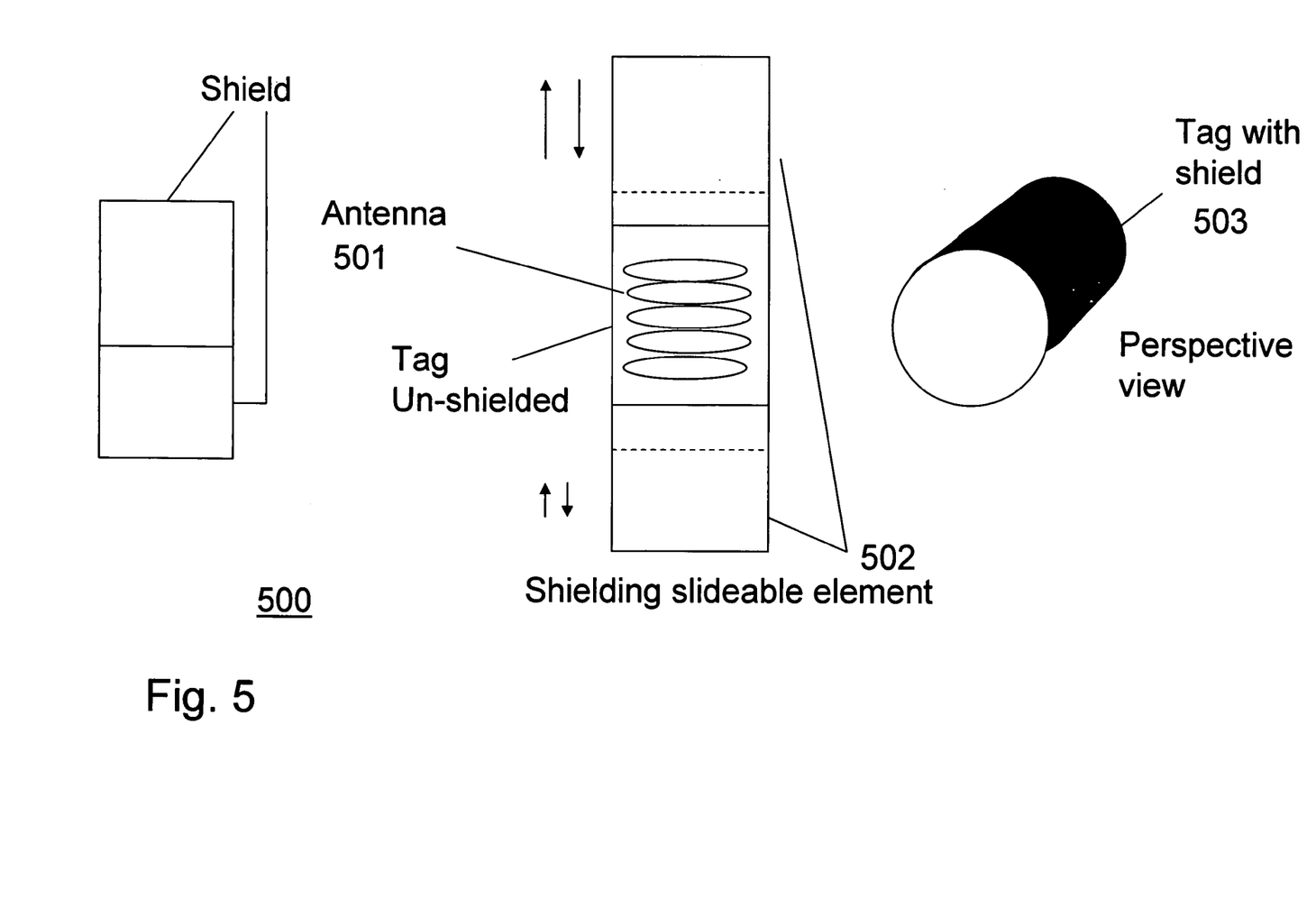
FIG. 5 shows a wireless "card" in the shape of a cylinder in which the antenna of FIGS. 3 and 4 is replaced by a magnetic pickup coil which can be enabled/disabled.

FIG. 5 shows a wireless "card" in the shape of a cylinder where the antenna of FIGS. 3 and 4 is replaced by a magnetic pickup coil 501 which can be enabled/disabled. Additionally, we may use retractable shielding to deactivate RFID devices of cards shaped other than the standard credit card shape. Cylindrical RFID cards or tags such as tag 500, may be shielded through the use of a deployable cylindrical shield 502, also constructed of the appropriate material described above. The tag with shield in place is shown in perspective view 503. When the shield is moved to one end of the tag to uncover the antenna, the tag functions normally. Stops, not shown, may be used to keep the sliding portion integral with the cylindrical tag. Additionally other mechanical constructs may be used to join movable or deployable shields to wireless cards. These may include hinges, rotating assemblies, or envelopes attached by means of flexible members.

Figure 6:
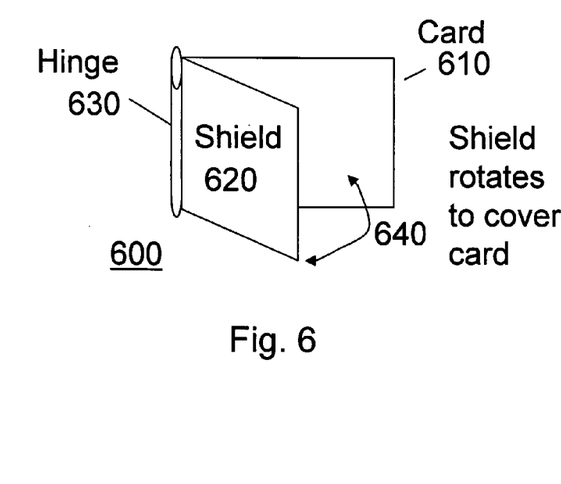
FIG. 6 shows a wireless card with an attached shield on a hinge.
Figure 7:
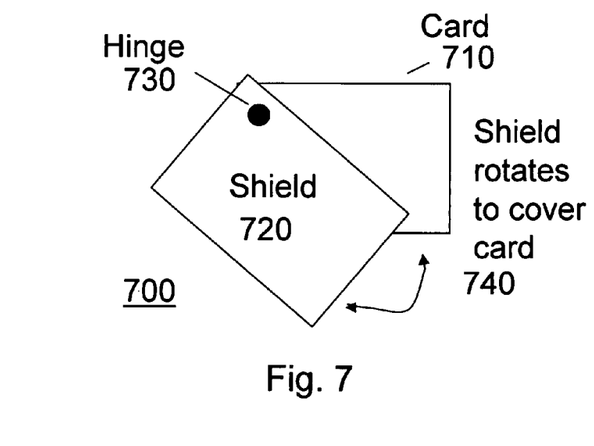
FIG. 7 shows a wireless card with an attached shield on a hinge such that the plane of the shield rotates in the plane of the card.
Figure 8:
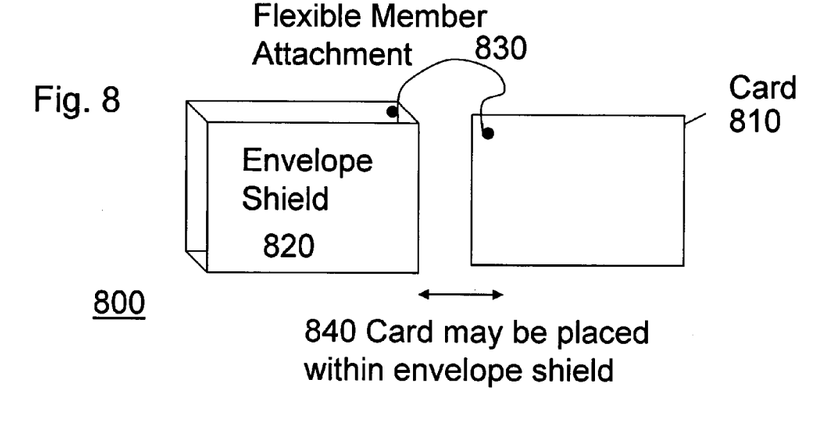
FIG. 8 shows a card with a shield attached by means of a flexible member.

For example, FIG. 6 shows a card 610 with an attached shield 620 on a hinge 630. The card 610 is attached to the shield 620 by means of the hinge 630. The shield may be rotated 640 on the hinge in a direction out of the plane of the card to either cover or uncover the card. In general, for this configuration a second rotatable shield (not shown), similar to shield 620, would be placed on the hinge so as to be able to cover the opposite side of the card. For high-frequency shielding only one conducting shield may be required since the electric field will be zero at the surface of the conductor. FIG. 7 shows a card 710 with an attached shield 720 on a hinge such that the plane of the shield rotates in the plane of the card 740. The card 710 is attached to the shield 720 by means of the hinge 730. The shield may be rotated 740 in the plane of the card to either cover or uncover the card. As in FIG. 6, a second shield on the opposite side of the card may be used to completely shield the card. FIG. 8 shows a card with a shield 820 attached by means of a flexible member 830. The card 810 may be placed 840 within the shield 820 to shield the card. The flexible member 830 may be a string, a chain, or a wire.

Thus, the present invention includes a card, fob or tag comprising a memory, or an electrical circuit, embedded within the card in combination (usually though not always) with an antenna embedded within the card, the antenna electrically connected to the circuit. The card or tag also has a deployable member mechanically coupled to the card, with the deployable member having electromagnetic shielding capability. The member can be selectively placed to control reception of the antenna of a signal for the electrical circuit.

Some embodiments of the card, include one or more of the following variations: the shielding method or control includes the shielding member having at least one position to completely shield the antenna (or in some cases a circuit not requiring an antenna) from the signal; the antenna is on an exterior surface of the card or laminated within the card; a chip is mounted on an exterior surface or within the lamination of the card; control of the deployable member includes mechanical movement so as to cover and uncover the antenna; the deployable member includes a shielding material taken from a group of shielding materials such as magnetic, electrical materials; and/or the mechanical movement of the deployable member can be such that the member is held by way of a slot in the card.

Examples of magnetic materials are mu metal, Metglas$^{Reg.}$ and any combination of these. For magnetic shielding, it is advantageous that the mu metal be at least 0.001 centimeters thick. In general the thickness of the deployable member is such that the skin depth is less than the thickness of the deployable shielding member. Shielding capability includes selecting materials having at least one of high magnetic permeability and high electrical conductivity. The signal for which shielding is selectively sought includes an interrogation signal of the interrogation circuit or a signal that can impart information on the electrical circuit such as a chip or microchip. The deployable shield is coupled in a slideably or otherwise mechanically adjustable manner.

For high frequency signals, (typically in the 100's of MHz range or greater, the deployable member may include an insulating material (wood, plastic or the like, for example several 10's of mils in thickness). This insulating deployable member has on its entire inner or outer surface area a thin deposition of a metallic layer (in the range of 1–5000 Angstroms that completely encompasses the inner or outer surface area of the deployable member. This thin metallic layer acts to shield the tag from the aforementioned high frequencies.

The invention can also be implemented as a shielding method by providing a card having a memory or circuit to be controlled, and mechanically coupling a shielding member to the card to selectively shield the circuit. The invention is further implemented as a shielding method comprising by selectively moving a shielding material mechanically coupled to the card such as to block an antenna in the card from receiving an external signal. The invention can also be implemented as means for selectively moving a shielding material mechanically coupled to said card such as to block an antenna within a lamination of a card or on the surface of a card from receiving an external signal. The invention may also be implemented to shield non-electrical circuit memory devices.

The invention can also be implemented as a portable transponder having a memory or circuit. The transponder comprising: a non-electrical circuit memory device, a deployable member mechanically coupled to the transponder, the member having electromagnetic shielding capability to shield the circuit from a signal intended for the circuit, and the member being selectively placed as to enable a user to control reception by the circuit of a signal intended for said electrical circuit. The memory device is generally but not always embedded in the transponder.

Typically, the memory is a memory selected from a group of memories including: an electrical circuit and antenna, said antenna electrically coupled to said circuit; magnetic device; resonant structure; micromechanical device; non-electrical circuit memory device; and any combination of these circuits.

Typically, the transponder is one of the following: a credit card, a debit card, a fob, a transaction card, and a swipeable card. The transponder is typically carried by a person in order for a transaction to be performed. The transaction includes any giving and/or taking information to/from the card.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

We claim:

1. A card comprising:
    an electrical circuit embedded within said card;
    an antenna embedded within said card, said antenna electrically connected to said circuit;
    at least one magnetic strip on the card; and
    a deployable member mechanically coupled to said card, said member having electromagnetic shielding capability, and said member being selectively placed as to control, reception of said antenna of a signal for said electrical circuit, the member being movable to shield the antenna but not the magnetic strip.

2. A card as in claim 1, wherein said control includes said member having at least one position to completely shield said antenna from said signal.

3. A card as in claim 1, wherein one of the antenna and the circuit is on an exterior surface of the card.

4. A card as in claim 1, wherein the circuit is one of a chip, more than one chip, and consists of only resistors, capacitors and inductors.

5. A card as in claim 1, wherein said control of said deployable member includes mechanical movement so as to cover and uncover said antenna.

6. A card as in claim 1 wherein said deployable member includes a shielding material taken from a group of shielding materials consisting of: magnetic shielding material; electrical shielding material; mu metal; Metglas Reg., and any combination of these.

7. A card as in claim 1, wherein said deployable member is held by means of a slot in said card.

8. A card as in claim 6, wherein the shielding material is at least 0.001 centimeters thick.

9. A card as in claim 1, wherein a thickness of said deployable member is such that a skin depth of said member is less than the thickness of said member.

10. A card as in claim 1, wherein said shielding capability includes being a material having at least one of: high magnetic permeability and high electrical conductivity.

11. A card as in claim 1, wherein said signal includes an interrogation of said circuit.

12. A card as in claim 1, wherein said mechanically coupled deployable member is coupled in a slideably adjustable manner.

13. A card as in claim 1, wherein said signal is a high frequency signal and said deployable member has a deposition of a thin metallic shielding layer deposited onto said deployable member.

14. An apparatus for shielding a card, said apparatus comprising:
    means for selectively moving a shielding material mechanically coupled to said card such as to block an antenna in said card from receiving an external signal; and
    slider position markers on the card for indicating that the antenna is completely shielded when the shielding material is located between the markers.

15. A card as in claim 1 wherein said deployable member is moved in a direction out of the plane of the card.

16. A card as in claim 1 wherein said deployable member is moved in a direction in the plane of the card.

17. A card as in claim 1 wherein said deployable member is attached to said card by means of a hinge.

18. A card as in claim 1 wherein said deployable member is attached to said card by means of a flexible number.

19. A portable transponder having a memory, said transponder comprising:

a deployable member mechanically coupled to said transponder, said member having shielding capability to shield said memory from a signal intended for said memory, and said member being selectively placed as to enable a user to control reception by said memory of said signal, the member being movable in a direction out of the plane of the card.

20. A transponder as in claim 19, wherein said memory is a memory selected from a group of memory consisting of: an electrical circuit and antenna, said antenna electrically coupled to said circuit; magnetic devices; resonant structure; micromechanical device; non-electrical circuit memory device; and any combination of these memories.

21. A transponder as in claim 19, wherein said transponder is a means selected from a group of means consisting of: a credit card, a debit card, a fob, a transaction card, and a swipeable card.

22. A transponder as in claim 19, wherein said transponder is carried by a person in order for a transaction to be performed.

* * * * *